United States Patent [19]

Strait

[11] Patent Number: 4,990,037
[45] Date of Patent: Feb. 5, 1991

[54] PORTABLE BORING MACHINE

[75] Inventor: David S. Strait, Newberg, Oreg.

[73] Assignee: Climax Portable Machine Tools, Inc., Newberg, Oreg.

[21] Appl. No.: 388,985

[22] Filed: Aug. 2, 1989

[51] Int. Cl.[5] .............................................. B23B 41/12
[52] U.S. Cl. ................................... 408/72 R; 74/57;
74/84 R; 74/120; 82/1.4; 408/129; 408/135;
408/708
[58] Field of Search ............... 408/129, 132, 133, 135,
408/708, 709, 124, 72 R, 79–82; 74/30, 54–57,
84 R, 120; 82/128, 1.4; 409/175, 178

[56] References Cited

U.S. PATENT DOCUMENTS

| 1,794,149 | 2/1931 | Collins. | |
|---|---|---|---|
| 1,862,866 | 6/1932 | Storm. | |
| 1,899,128 | 2/1933 | Andersen. | |
| 2,170,054 | 8/1939 | Jeschor | 77/3 |
| 2,963,927 | 12/1960 | Hanger | 77/13 |
| 4,406,566 | 9/1983 | Bauer | 408/129 |
| 4,609,311 | 9/1986 | Pettyjohn | 48/79 |
| 4,850,756 | 7/1989 | Dubois | 408/708 X |

Primary Examiner—Steven C. Bishop
Attorney, Agent, or Firm—Dellett, Smith-Hill and Bedell

[57] ABSTRACT

A boring machine includes a power unit having a housing, a drive member for engaging a boring bar, and a motor for driving the drive member to rotate relative to the housing. The boring machine also includes a bearing assembly comprising an inner bearing member defining a passage through which the boring bar extends, and an outer bearing member in which the inner bearing member is fitted in a manner permitting angular movement of the inner bearing member relative to the outer bearing member about axes perpendicular to the axis of the passage defined by the inner bearing member. In use, the bearing assembly is attached to a workpiece in a manner preventing movement of the outer bearing member relative to the workpiece, and a collapsible torque transmission linkage connects the housing of the power unit to the outer bearing member, whereby the housing unit is held against rotation relative to the outer bearing member.

35 Claims, 6 Drawing Sheets

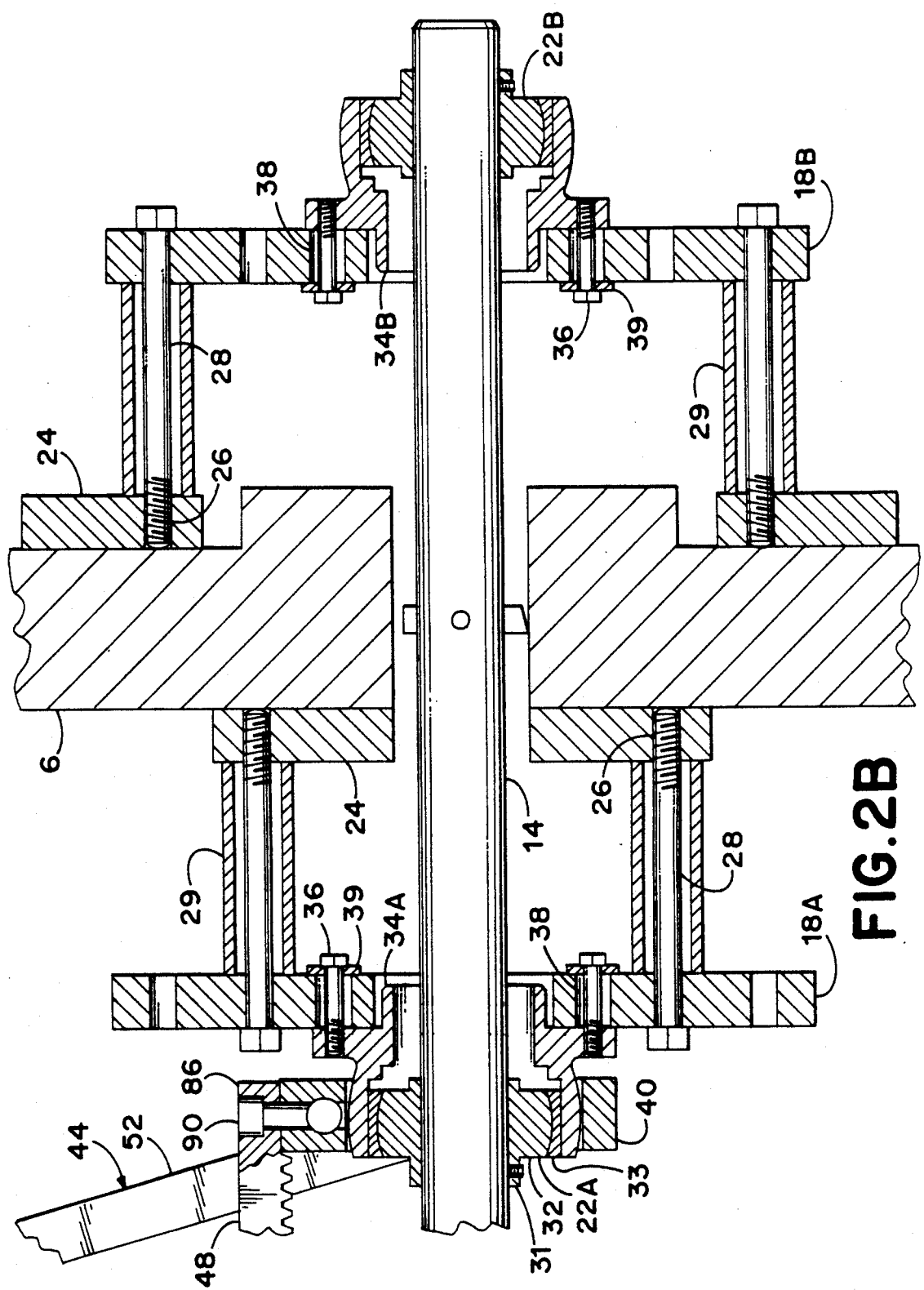

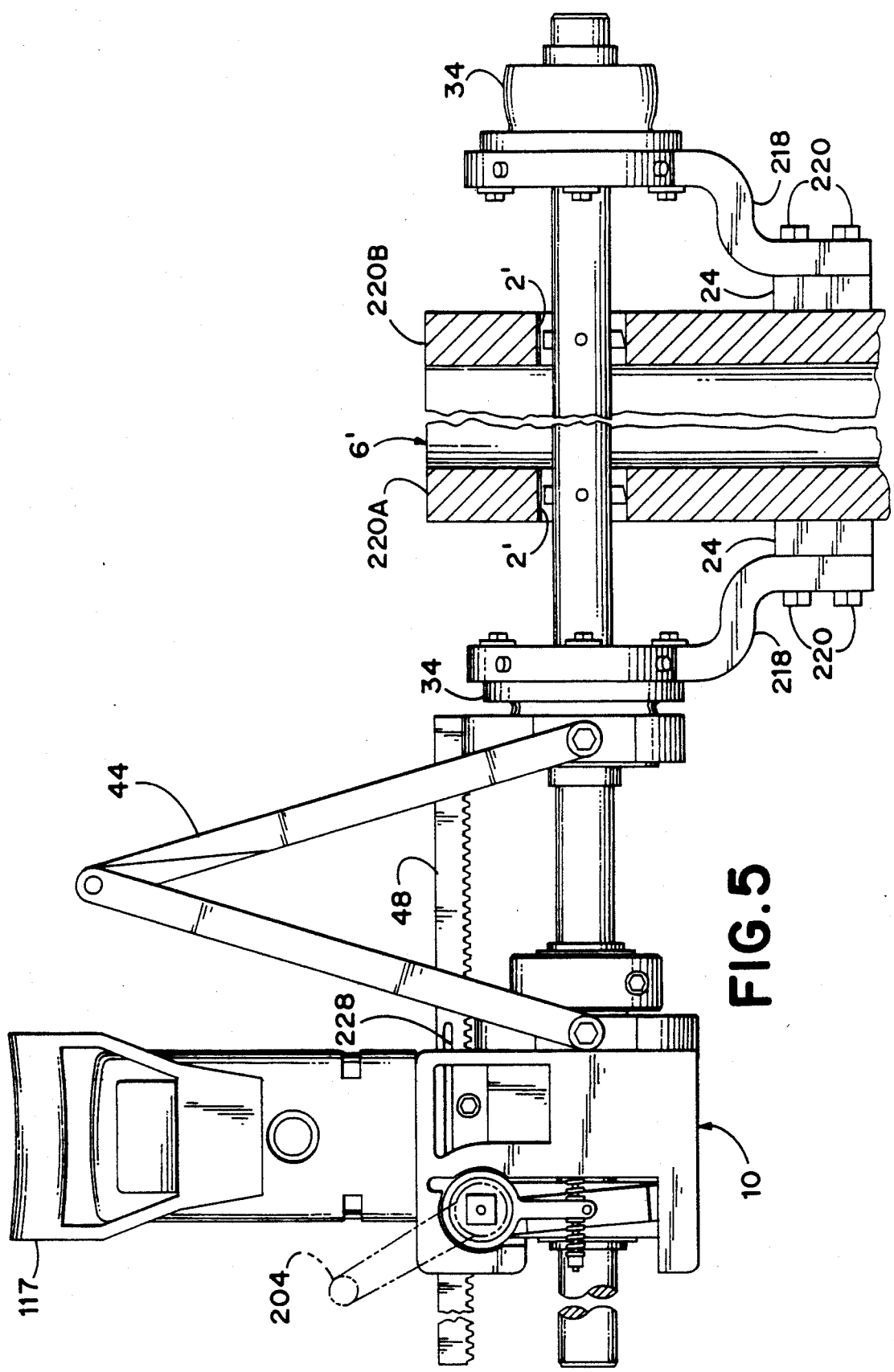

4,990,037

PORTABLE BORING MACHINE

BACKGROUND OF THE INVENTION

This invention relates to a portable boring machine.

Line boring is an operation whereby two axially aligned holes are bored in a workpiece. Typically, line boring is used to bore holes in the mounting ears for the bucket of a backhoe, where the previous holes have become enlarged through wear. Weld is built up on the interior of the previous holes, and is then bored out to define the new holes.

A conventional line boring machine comprises a power unit, a boring bar, which carries a cutting tool, and a supporting structure for supporting the boring bar and holding the power unit against rotation. The supporting structure is independent of the workpiece. The boring bar is circular in cross section, except for a key slot, and is connected drivingly to the power unit by use of a key that engages the key slot. The boring bar is positioned in the existing holes in the workpiece with the aid of cones that are fitted on the boring bar and are used to center the boring bar in the holes. When the boring bar is in the proper position, the supporting structure is locked to prevent further movement of the boring bar transverse to its central axis, and the cones are removed.

A conventional line boring machine is subject to disadvantage, in that it is heavy, and cannot be considered to be portable. Therefore, use of the conventional line boring machine in the field is difficult and inconvenient. In addition, the requirement that the boring bar be keyed precludes the use of standard bar material. Moreover, adjustment of the position of the boring bar during set-up of the machine is accomplished with the aid of the supporting structure, which supports the boring bar at one end through the power unit and at its opposite end through a bearing, and consequently it is necessary to move the power unit in order to center and align the boring bar. This results in the set-up of the machine being difficult.

SUMMARY OF THE INVENTION

In accordance with a first aspect of the invention, a boring machine includes a power unit having a housing, a drive member for engaging a boring bar, and a motor for driving the drive member to rotate relative to the housing. The boring machine also includes a bearing assembly comprising an inner bearing member defining a passage through which the boring bar extends, and an outer bearing member in which the inner bearing member is fitted in a manner permitting angular movement of the inner bearing member relative to the outer bearing member about axes perpendicular to the axis of the passage defined by the inner bearing member. In use, the bearing assembly is attached to a workpiece in a manner preventing movement of the outer bearing member relative to the workpiece, and a collapsible torque transmission linkage connects the housing of the power unit to the outer bearing member, whereby the housing unit is held against rotation relative to the outer bearing member.

In accordance with a second aspect of the invention, a boring machine comprises a boring bar of circular external cross section, a power unit having a housing, a drive member including clamp means for gripping the boring bar and holding it against movement relative to the drive member, and a motor for driving the drive member to rotate relative to the housing. A bearing assembly defines a passage through which the boring bar extends. In use, attachment means attach the bearing assembly to a workpiece, and a collapsible torque transmission linkage connects the housing of the power unit to the attachment means, whereby the housing unit is held against rotation relative to the attachment means.

In accordance with a third aspect of the invention, a rotary drive mechanism for bringing about rotation of a shaft about a central axis thereof comprises a support structure, a cam member having a cam surface, means for moving the cam member relative to the support structure cyclically along a predetermined path, a cam follower positioned to engage the cam surface during at least a portion of each cycle of movement of the cam member and pivotable relative to the housing about the axis of rotation of the shaft, and clutch means effective to transmit pivotal movement of the cam follower in a first sense to the shaft and to not transmit pivotal movement of the cam follower in a second sense, opposite said first sense, to the shaft.

BRIEF DESCRIPTION OF THE DRAWINGS

For a better understanding of the invention, and to show how the same may be carried into effect, reference will now be made, by way of example, to the accompanying drawings in which:

FIG. 5 is a side elevation, partly in section, showing use of the FIG. 1 machine as a line boring machine.

DETAILED DESCRIPTION

Figure 1:
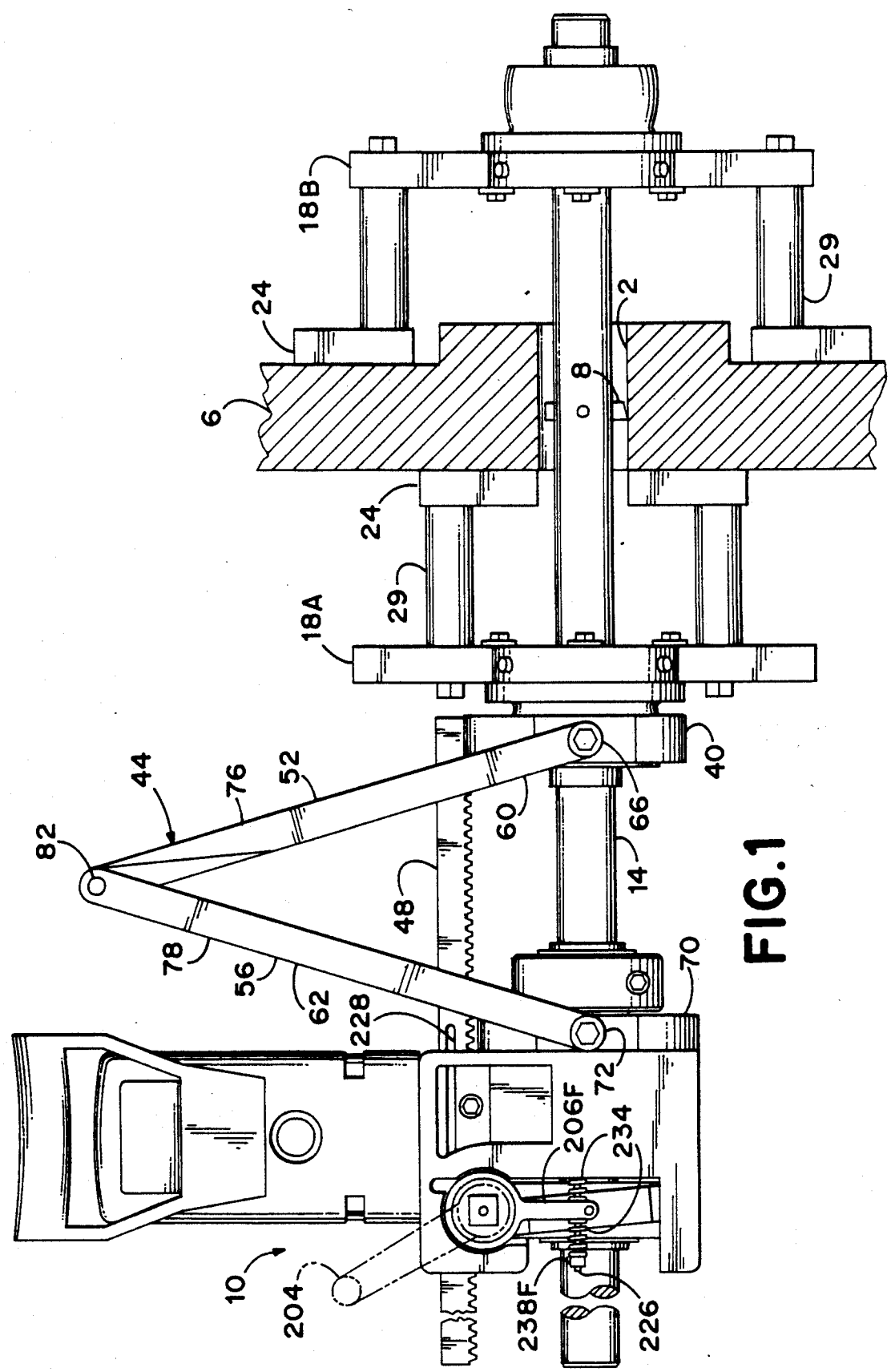
FIG. 1 is a side elevation, partly in section, of a boring machine embodying the present invention, FIGS. 2A and 2B, hereinafter referred to collectively as FIG. 2, show a longitudinal sectional view of the machine illustrated in FIG. 1 to an enlarged scale.

As shown in FIG. 1, the boring machine comprises a power unit 10 and a boring bar 14. Boring bar 14 extends through a hole 2 in a workpiece 6 and carries a tool 8. Power unit 10 rotates boring bar 14, and tool 8 bores hole 2.

Two scab plates 24 are welded to workpiece 6 at opposite sides thereof. Each scab plate is formed with several internally threaded holes 26 (FIG. 2B). Screws 28, which engage holes 26, are used to attach two mounting brackets 18A, 18B to scab plates 24 respectively. Spacer sleeves 29 are employed to hold each mounting bracket 18 at a fixed distance from its scab plate 24. Mounting brackets 18A, 18B support bearing assemblies 22A, 22B respectively, and boring bar 14 extends through bearing assemblies 22. In this fashion, the boring machine is supported directly by the workpiece in a manner preventing movement of the boring machine in directions perpendicular to the central axis of boring bar 14.

As shown in FIG. 2B, each bearing assembly 22 comprises a self-aligning bearing insert, having an inner race 31, which defines a cylindrical passage through which boring bar 14 extends, an outer race 32 having a spherically curved exterior surface, and a sleeve 33 having a spherically curved interior surface and a cylindrical exterior surface. Bearing balls (not shown) are interposed between inner race 31 and outer race 32. Outer race 32 is fitted in the recess defined by the interior surface of sleeve 33, and the spherically curved surfaces allow angular movement of inner race 31 relative to sleeve 33 about axes that are perpendicular to the central axis of the passage defined by inner race 31.

Bearing assemblies 22A, 22B are connected to brackets 18A, 18B by bearing mounts 34A, 34B respectively. Each bearing mount 34 is firmly attached to its associated mounting bracket 18 by screws 36 that extend through holes 38 in mounting bracket 18. Holes 38 are larger than screws 36 and therefore define a limited range of movement of bearing mount 34 relative to mounting bracket 18. Washers 39 prevent the heads of screws 36 from entering holes 38.

Bearing mount 34 defines an internal cylindrical bore in which sleeve 33 of bearing assembly 22 is received, and has a spherically curved exterior surface. Bearing mount 34A is received in a collar 40 which defines an internal cylindrical bore so that relative angular movement of bearing mount 34A and collar 40 is permitted. Collar 40 is split, and a clamping screw is used to clamp collar 40 onto bearing mount 34A.

Bearing assembly 22 and bearing mount 34 allow the central axis of the passage defined by inner race 31 and the central axis of the cylindrical bore defined by collar 40 to coincide, provided that the central axis of the cylindrical bore defined by bearing mount 34 is inclined at no more than about 5° to the axis of the passage defined by inner race 31. Therefore, the orientation of mounting bracket 18 relative to workpiece 6 is not critical to achieving a desired orientation of boring bar 14 relative to workpiece 6. Thus, for example, if mounting bracket 18 is somewhat skewed from perpendicular to the central axis of boring bar 14, the angular movement permitted by bearing insert 33, bearing mount 34 and collar 40 ensures that the central axis of the cylindrical interior surface of collar 40 can still coincide with the central axis of boring bar 14.

Referring again to FIG. 1, collar 40 is coupled to power unit 10 by torque scissors 44 and a feed rack 48. Torque scissors 44 comprise two generally Y-shaped members 52 and 56. Member 52 has legs 60 that are attached to collar 40 at opposite respective sides thereof by screws 66, whereas member 56 has legs 62 that are connected to opposite respective sides of a collar 70 that forms part of power unit 10, by screws 72. Members 52 and 56 have respective stems 76, 78, which are pivotally connected by a screw 82. Torque scissors 44 serve to hold power unit 10 against rotation relative to collar 40 while permitting linear movement of power unit 10 relative to collar 40 along the central axis of boring bar 14.

Feed rack 48 extends between legs 60, 62 of members 52, 56 and comprises a generally rectangular bar having an eye member 86 (FIG. 2B) projecting from one end thereof. A screw 90 passing through eye member 86 attaches rack 48 to collar 40. Rack 48 passes through a sleeve 92 (FIG. 2A) in power unit 10. The dimensions of collar 40 and the position of sleeve 92 in power unit 10 are such that rack 48 is parallel to boring bar 14.

Figure 2A:
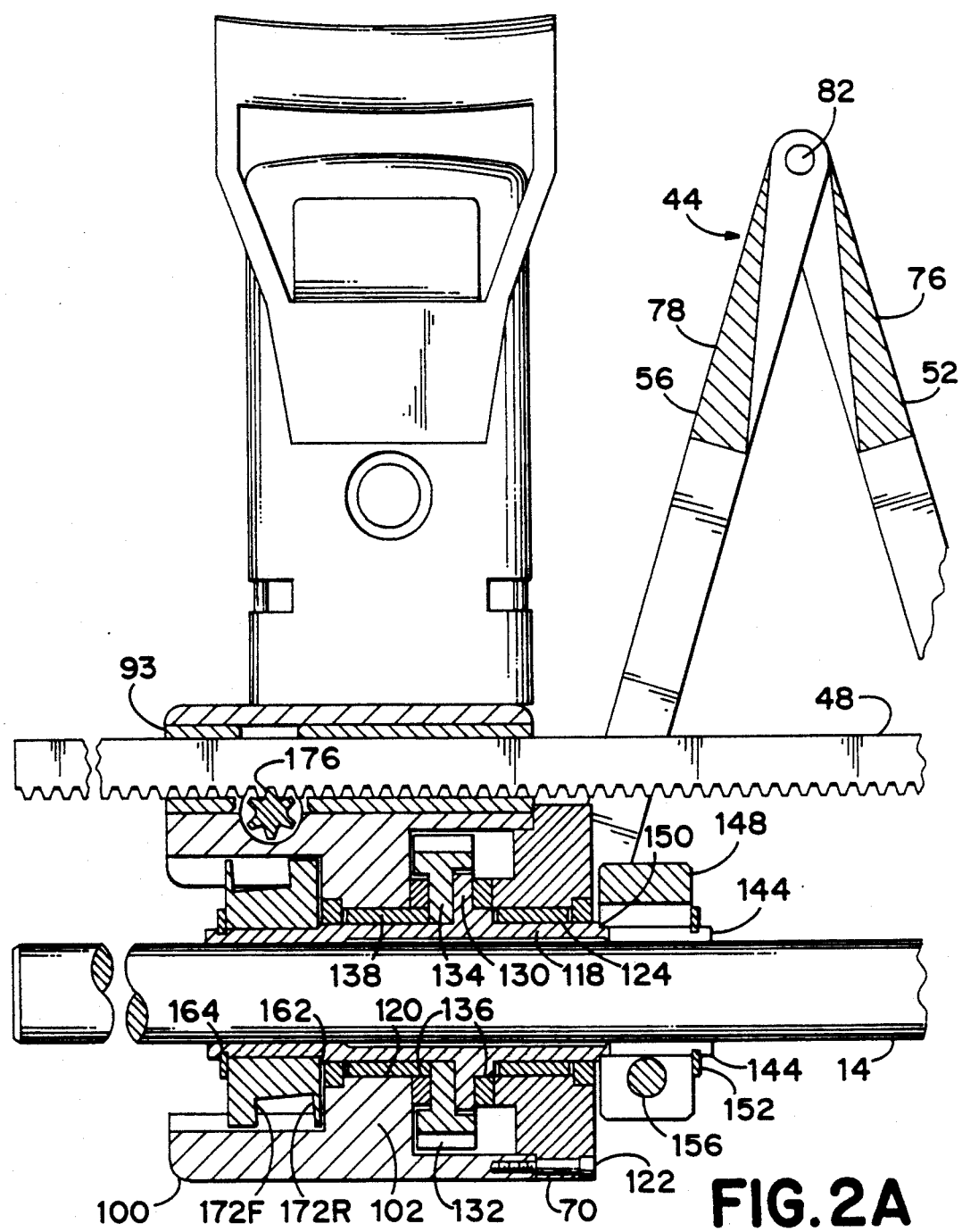
Figure 3:
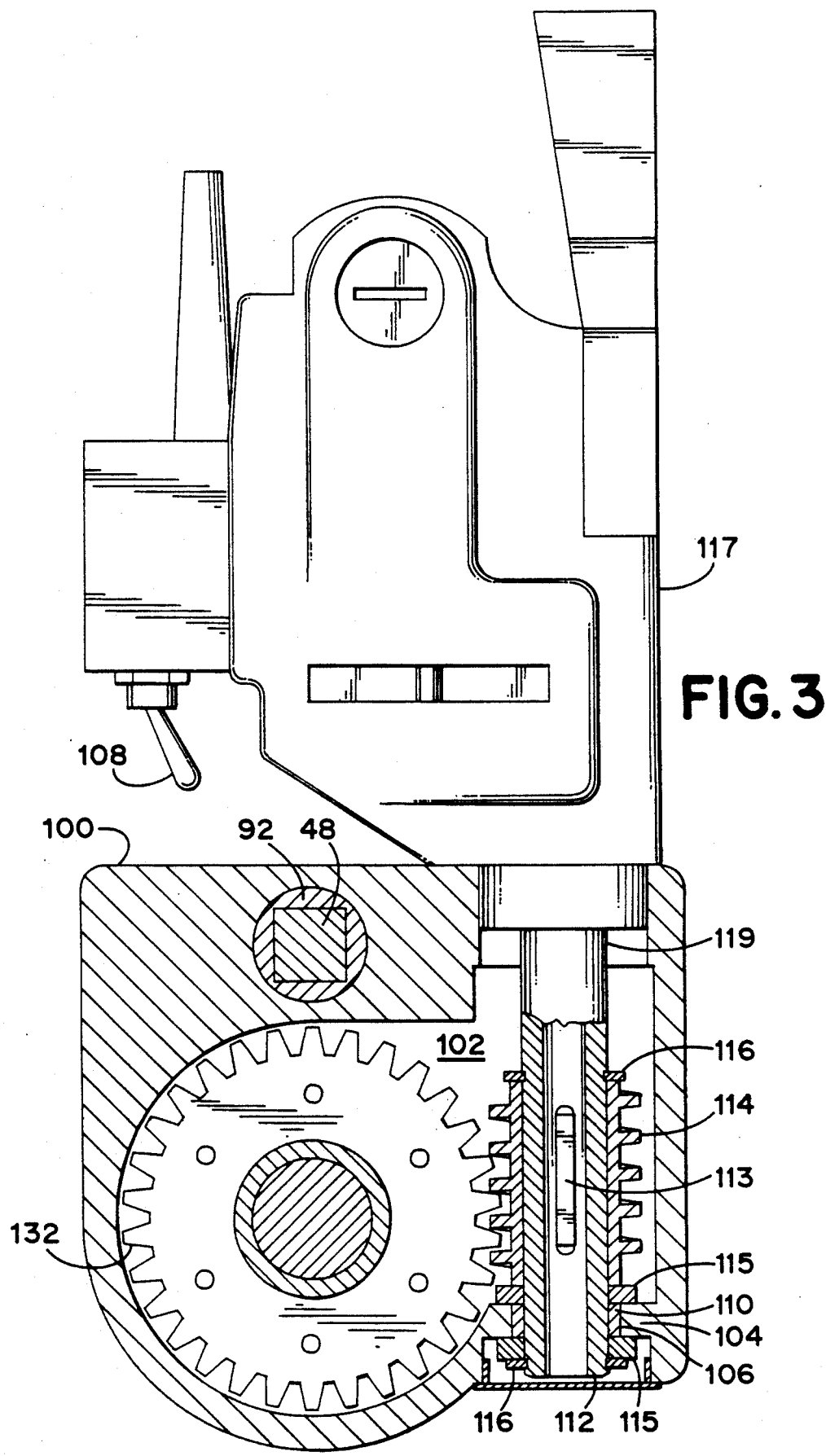
FIG. 3 is a part sectional view taken on the line III—III of FIG. 1.

Power unit 10 comprises a main housing 100 that is machined to define two walls 102 (FIGS. 2A and 3), 104 (FIG. 3). A hole 106 is machined in wall 104, and a drive shaft 112 is supported for rotation within hole 106 by a needle bearing 110. A worm 114 is mounted on shaft 112 and is held against rotational movement relative thereto by a key 113. Thrust bearings 115 and snap rings 116 prevent longitudinal movement of shaft 112 relative to housing 100 and of worm 114 relative to shaft 112.

A motor assembly 117 is attached to main housing 100. Motor assembly 117 includes an electric motor (not shown) having an on/off control switch 108 and an output shaft 119. Output shaft 119 extends into housing 100, coaxially with drive shaft 112, and is coupled drivingly to drive shaft 112 by means not shown. For example, shaft 112 might have an internally threaded bore, and shaft 119 might be externally threaded to engage the internally threaded bore in shaft 112.

Referring to FIG. 2A, a hole 120 is machined in wall 102, and a drive collet 118 extends through hole 120 and collar 70, which is attached to main housing 100 by screws 122. Needle bearings 124, 138 support collet 118 for rotation. Collet 118 has an external flange 130, to which a worm gear 132 is attached by screws (not shown) engaging an internal flange 134 of gear 132. Thrust bearings 136, effective between flanges 130, 134 and collar 70 and wall 102 respectively, hold collet 118 against longitudinal movement relative to housing 100. Collet 118 is positioned so that worm gear 132 is in meshing engagement with worm 114. Boring bar 14 extends coaxially within collet 118.

An end of collet 118 projects from main housing 100 through collar 70 and is slotted, as shown at 144. A collet clamp 148 is fitted over the slotted portion of collet 118, and is held in position between a shoulder 150 on collet 118 and a snap ring 152 fitted on collet 118. Collet clamp 148 includes a clamping bolt 156, which is used to tighten collet clamp 148 onto collet 118 and thereby clamp collet 118 onto boring bar 14 and hold the boring bar against movement relative to collet 118.

At its opposite end, collet 118 carries a feed cam ring 160. Cam ring 160 is held against longitudinal movement relative to collet 118 by a shoulder 162 and a snap ring 164. Cam ring 160 is slotted, and is secured against rotation relative to collet 118 by tightening a clamping bolt (not shown). Cam ring 160 has a peripheral groove defined between two cam surfaces 172F, 172R.

Figure 4:
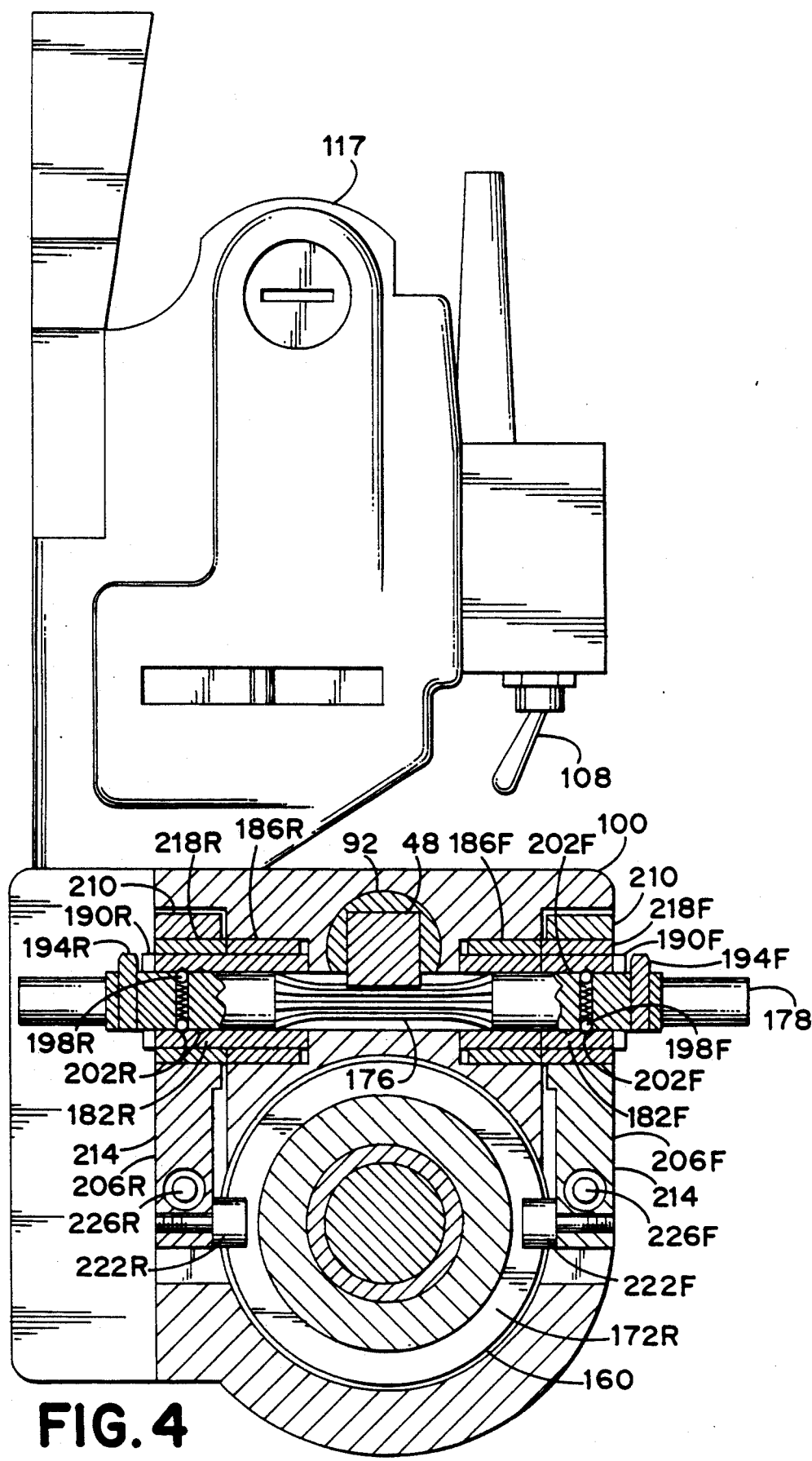
FIG. 4 is a sectional view taken on the line IV—IV of FIG. 1.

Referring to FIG. 4, feed rack 48 is in meshing engagement with a pinion 176, formed by a profiled segment of the length of a pinion shaft 178. Pinion shaft 178 extends coaxially within feed direction bushings 182F, 182R, which are supported within main housing 100 by roller clutches 186F, 186R respectively. Feed direction bushings 182 each have a slot 190 at their outboard end, for receiving a dowel pin 194. Pinion shaft 178 is displaceable longitudinally within feed direction bushings 182 among three detented positions, defined by engagement of spring-loaded detent balls 198 with annular grooves 202 in bushings 182. When detent balls 198 engage annular grooves 202N, as shown in FIG. 4, dowel pins 194 are clear of slots 190 respectively and pinion shaft 178 is free to rotate relative to main housing 100. In this condition, power unit 10 can be moved in the longitudinal direction of boring bar 14 relative to mounting brackets 18, to place tool 8 at a desired position relative to workpiece, by use of a crank 204 (FIG. 1) mounted removably on a square-section end of pinion shaft 178. When pinion shaft 178 is pushed to the left of FIG. 4, so that detent balls 198F are received in groove 202F, dowel pin 194F engages slot 190F and therefore feed direction bushing 182F and pinion shaft 178 are locked against rotation relative to each other. Similarly, when pinion shaft 178 is pushed to the right of FIG. 3, so that detent balls 198R are received in groove 202R, dowel pin 194R engages slot 190R and pinion shaft 96 is locked against rotation relative to feed direction bushing 182R.

During the following discussion, references to the direction of rotation of an element having a reference numeral and the suffix F relate to the element when seen from the right of FIG. 4 and references to the direction of rotation of an element having a reference numeral and the suffix R relate to the element when seen from the left of FIG. 4.

Clutches 186F, 186R allow rotation of feed direction bushings 182F, 182R respectively relative to housing 100 in the counterclockwise direction and prevent clockwise rotation of feed direction bushings 182F, 182R.

Feed levers 206F, 206R, each having an annular mounting portion 210 and a radial arm 214, are mounted on feed direction bushings 182F, 182R through respective roller clutches 218F, 218R. Clutches 218F, 218R allow clockwise rotation of feed levers 206F, 206R respectively relative to feed direction bushing 182F, 182R but prevent counterclockwise rotation.

At its outer end, each radial arm 214 carries a cam follower bearing 222, which projects into the peripheral groove of cam ring 160. A threaded rod 226 projects from main housing 100 through a hole 230 in each radial arm. As shown in FIG. 1, threaded rod 226 carries compression springs 234 and a knurled nut 238, whereby feed lever 206 is biased towards a selected angular position about the central axis of pinion shaft 178.

Referring again to FIG. 4, in operation of the boring machine, motor assembly 117 drives shaft 112 to rotate at a selected speed, and consequently collet 118, and boring bar 14 clamped thereto, are rotated at a speed related to the speed of rotation of shaft 112 by the velocity ratio of worm 114 and worm gear 132. As collet 118 rotates, cam ring 160 also rotates. If, for example, pinion shaft 178 is positioned with detent balls 198F engaging groove 202F, and nut 238F is positioned so that cam surface 172F engages cam follower bearing 222F during a part of each revolution of cam ring 160, feed lever 206F is urged in the counterclockwise direction when it engages the rising portion of cam surface 172F during each revolution of cam ring 160. The angular movement of feed lever 206F is transmitted through clutch 218F to feed direction bushing 182F, and accordingly pinion shaft 178 is rotated in the counterclockwise direction. On the falling portion of cam surface 172F, springs 234F return feed lever 206F to the biased position established by knurled nut 238F. Owing to clutch 218F, this clockwise rotation of feed lever 206F is not transmitted to pinion shaft 178. Roller clutch 186F prevents clockwise rotation of feed direction bushing 182F, and of pinion shaft 178 coupled thereto by dowel pin 194F engaging slot 190F, due to any other force acting on pinion shaft 178 or feed direction bushing 182F. Accordingly, as collet 118 rotates continuously, pinion shaft 178 rotates in stepwise fashion and through its engagement with feed rack 48 advances power unit 10 and boring bar 14 to the right of FIG. 1 relative to mounting brackets 18.

When the position of knurled nut 238F is changed, the proportion of each revolution of collet 118 for which cam follower bearing 222F engages the rising portion of cam surface 172F is changed, and accordingly the angle through which pinion shaft 178 is rotated on each revolution of collet 118 is changed. Thus, the feed rate of tool 8 is changed.

When power unit 10 reaches a prescribed limit for feeding to the right of FIG. 1, scissor member 56 engages a rod 228. Rod 228 is displaced to the left of FIG. 1 relative to power unit 10, and frictionally engages the annular mounting portion of feed lever 206F. The frictional force thus exerted by rod 228 on feed lever 206F overcomes the force of springs 234 tending to return lever 206F to its biased position, and therefore feeding of power unit 10 to the right of FIG. 1 ceases.

To bring about reverse feeding of tool 8, pinion shaft 178 is shifted to the right of FIG. 4, to the position in which detent balls 198R engage groove 202R and dowel pin 194R is received in slot 190R. In this configuration, feed direction bushing 182F is disengaged from pinion shaft 178, but feed direction bushing 182R is held against rotation relative to pinion shaft 178. In similar fashion, through the action of cam follower bearing 222R engaging cam surface 172R and through the action of roller clutches 218R and 186R, pinion shaft 178 is rotated stepwise in the counterclockwise direction as collet 118 rotates, and engagement of pinion shaft 178 with rack 48 results in tool 8 being fed to the left of FIG. 1 relative to the workpiece. Roller clutch 186R prevents rotation of shaft 178 in the clockwise direction.

In the configuration shown in FIG. 5, the boring machine is used for line boring. The work piece 6', which may be the bucket of a backhoe, has two portions 220A, 220B that are spaced apart, and each is formed with a circular hole 2'. Scab plates 24 are welded to the two portions respectively of the workpiece, and mounting brackets 218 are attached to the scab plates by screws 220 that fit in slotted holes (not shown) of the mounting brackets. In this manner, the mounting brackets are movable linearly relative to the workpiece. Bearing mounts 34, which are attached to mounting brackets 218 in similar fashion to that described with reference to FIG. 2B, carry bearing assemblies 22. In order to set up the boring machine, power unit 10 is removed from boring bar 14, and boring bar 14 is fitted in bearing assemblies 22. The position and orientation of boring bar 14 relative to workpiece 6' are then adjusted, for example by use of cones to center the boring bar in holes 2'. Bearing mounts 34 are then secured firmly to brackets 221 and the cones are removed, and the power unit is mounted on the boring bar and is attached to collar 40 through torque scissors 44 and rack 48. Therefore it is not necessary to move the mass of power unit 10 when adjusting the position and orientation of boring bar 14, and this makes adjustment much easier than has heretofore been the case.

It will be appreciated that the invention is not restricted to the particular embodiment that has been described, and that variations may be made therein without departing from the scope of the invention as defined in the appended claims and equivalents thereof.

I claim:
1. A boring machine comprising:
   a power unit having a housing, a drive member for engaging a boring bar, and a motor for driving the drive member to rotate relative to the housing,
   a bearing assembly comprising an inner bearing member defining a passage through which the boring bar extends, and an outer bearing member in which the inner bearing member is fitted in a manner permitting angular movement of the inner bearing member relative to the outer bearing member about axes perpendicular to the axis of the passage defined by the inner bearing member, attachment means for attaching the bearing assembly to a workpiece in a manner preventing movement of the outer bearing member relative to the workpiece, and a collapsible torque transmission linkage connecting the housing of the power unit to the outer bearing member, whereby the housing unit is held against rotation relative to the outer bearing member.

2. A boring machine according to claim 1, wherein the drive member includes clamp means for gripping a boring bar of circular external cross section and holding it against movement relative to the drive member.

3. A boring machine according to claim 1, comprising a feed transmission member extending within the housing of the power unit and connected to the outer bearing member in a manner preventing linear movement of the feed transmission member relative to the outer bearing member, and wherein the power unit comprises a feed member in driving engagement with the feed transmission member and operative to bring about linear movement of the power unit relative to the feed transmission member.

4. A boring machine according to claim 3, wherein the feed transmission member comprises a rack and the feed member comprise a pinion in meshing engagement with the rack and supported within the housing for rotation.

5. A boring machine according to claim 4, wherein the pinion is formed by a profiled length segment of a pinion shaft that is displaceable longitudinally relative to the housing between at least a first detented position and a second detented position, and the power unit comprises feed drive means effective between the drive member and the pinion shaft for rotating the pinion shaft in a first sense when the pinion shaft is in said first detented position and in a second sense, opposite said first sense, when the pinion shaft is in said second detented position.

6. A boring machine according to claim 5, wherein the feed drive means comprise a cam member coupled drivingly to the drive member and having a cam surface, a cam follower positioned to engage the cam surface during at least a portion of each revolution of the cam member and pivotable about the axis of rotation of the pinion shaft, and clutch means effective to transmit pivotal movement of the cam follower in said first sense to the pinion shaft when the pinion shaft is in said first detented position and to not transmit pivotal movement of the cam follower in said second sense to the pinion shaft.

7. A boring machine according to claim 6, wherein the cam surface is annular and is coaxial with the drive member, and the axis of rotation of the pinion shaft is perpendicular to the axis of the drive member.

8. A boring machine according to claim 6, wherein the clutch means are effective between the cam follower and a feed direction bushing, and the feed drive means comprise means for preventing relative rotational movement of the feed direction bushing and the pinion shaft when the pinion shaft is in its first position.

9. A boring machine according to claim 8, comprising a backlash prevention clutch effective between the feed direction bushing and the housing to permit rotation of the feed direction bushing relative to the housing in said first sense and to prevent rotation of the feed direction bushing relative to the housing in said second sense.

10. A boring machine according to claim 6, wherein the cam member has a second cam surface and the feed drive means comprise a second cam follower positioned to engage the second cam surface during at least a portion of each revolution of the cam member and pivotable about the axis of rotation of the pinion shaft, and second clutch means effective to transmit pivotal movement of the second cam follower in said second sense to the pinion shaft when the pinion shaft is in its second detented position and to not transmit pivotal movement of the second cam follower in said first sense to the pinion shaft.

11. A boring machine according to claim 5, wherein the pinion shaft is displaceable relative to the housing from said first detented position or said second detented position to a third detented position, in which the pinion shaft is rotatable relative to the housing in either sense.

12. A boring machine according to claim 1, wherein the collapsible torque transmission linkage comprises a first link connected to the housing in a manner permitting pivotal movement of the first link relative to the housing about an axis perpendicular to the axis of rotation of the drive member, a second link connected to the outer bearing member in a manner permitting pivotal movement of the second link relative to the outer bearing member about an axis perpendicular to the central axis of the passage defined by the inner bearing member, and pivot means connecting the first and second links together in a manner permitting relative angular movement thereof.

13. A boring machine according to claim 12, wherein the first link comprises a first Y-shaped member having two legs attached to the housing at opposite sides respectively of the rotational axis of the drive member, and also having a stem, and the second link comprises a second Y-shaped member having two legs connected to the outer bearing member at opposite sides respectively of the central axis of the passage defined by the inner bearing member, and also having a stem, the stems of the first and second Y-shaped members being connected together for relative pivotal movement about an axis parallel to the axes of pivotal movement of the first and second Y-shaped members relative to the housing and the outer bearing member respectively.

14. A boring machine according to claim 1, wherein the Outer bearing member has a cylindrical external surface defining a central axis and the point about which the inner bearing member is able to undergo angular movement relative to the outer bearing member lies on said central axis, and the attachment means comprise a bearing mount having a cylindrical internal surface and a spherically curved external surface, the center of curvature of said external surface lying on the central axis of said internal surface, and a collar that is mounted on the bearing mount and engages the external surface thereof, whereby the collar is able to undergo angular movement relative to the bearing mount about the center of curvature of said external surface.

15. A boring machine according to claim 14, wherein the collapsible torque transmission linkage is connected to the outer bearing member through the collar.

16. A boring machine comprising:
a boring bar of circular external cross section,
a power unit having a housing, a drive member including clamp means for gripping the boring bar and holding it against movement relative to the drive member, and a motor for driving the drive member to rotate relative to the housing, a bearing assembly defining a passage through which the boring bar extends, attachment means for attaching the bearing assembly to a workpiece, and a collapsible torque transmission linkage connecting the housing of the power unit to the attachment means, whereby the housing unit is held against rotation relative to the attachment means.

17. A boring machine according to claim 16, wherein the bearing assembly comprises an inner bearing member defining said passage, and an outer bearing member in which the inner bearing member is fitted in a manner permitting angular movement of the inner bearing member relative to the outer bearing member about axes perpendicular to the axis of the passage defined by the inner bearing member, and the attachment means attach the bearing assembly to a workpiece in a manner preventing movement of the outer bearing member relative to the workpiece.

18. A boring machine according to claim 17, wherein the outer bearing member has a cylindrical external surface defining a central axis and the point about which the inner bearing member is able to undergo angular movement relative to the outer bearing member lies on said central axis, and the attachment means comprise a bearing mount having a cylindrical internal surface and a spherically curved external surface, the center of curvature of said external surface lying on the central axis of said internal surface, and a collar that is mounted on the bearing mount and engages the external surface thereof, whereby the collar is able to undergo angular movement relative to the bearing mount about the center of curvature of said external surface.

19. A boring machine according to claim 18, wherein the collapsible torque transmission linkage is connected to the outer bearing member through the collar.

20. A boring machine according to claim 16, comprising a feed transmission member extending within the housing of the power unit and connected to the bearing assembly in a manner preventing linear movement of the feed transmission member relative to the bearing assembly, and wherein the power unit comprises a feed member in driving engagement with the feed transmission member and operative to bring about linear movement of the power unit relative to the feed transmission member.

21. A boring machine according to claim 20, wherein the feed transmission member comprises a rack and the feed member comprise a pinion in meshing engagement with the rack and supported within the housing for rotation.

22. A boring machine according to claim 21, wherein the pinion is formed by a profiled length segment of a pinion shaft that is displaceable longitudinally relative to the housing between at least a first detented position and a second detented position, and the power unit comprises feed drive means effective between the drive member and the pinion shaft for rotating the pinion shaft in a first sense when the pinion shaft is in said first detented position and in a second sense, opposite said first sense, when the pinion shaft is in said second detented position.

23. A boring machine according to claim 22, wherein the feed drive means comprise a cam member coupled drivingly to the drive member and having a cam surface, a cam follower positioned to engage the cam surface during at least a portion of each revolution of the cam member and pivotable about the axis of rotation of the pinion shaft, and clutch means effective to transmit pivotal movement of the cam follower in said first sense to the pinion shaft when the pinion shaft is in said first detented position and to not transmit pivotal movement of the cam follower in said second sense to the pinion shaft.

24. A boring machine according to claim 23, wherein the cam surface is annular and is coaxial with the drive member, and the axis of rotation of the pinion shaft is perpendicular to the axis of the drive member.

25. A boring machine according to claim 23, wherein the clutch means are effective between the cam follower and a feed direction bushing, and the feed drive means comprise means for preventing relative rotational movement of the feed direction bushing and the pinion shaft when the pinion shaft is in its first position.

26. A boring machine according to claim 25, comprising a backlash prevention clutch effective between the feed direction bushing and the housing to permit rotation of the feed direction bushing relative to the housing in said first sense and to prevent rotation of the feed direction bushing relative to the housing in said second sense.

27. A boring machine according to claim 23, wherein the cam member has a second cam surface and the feed drive means comprise a second cam follower positioned to engage the second cam surface during at least a portion of each revolution of the cam member and pivotable about the axis of rotation of the pinion shaft, and second clutch means effective to transmit pivotal movement of the second cam follower in said second sense to the pinion shaft when the pinion shaft is in its second detented position and to not transmit pivotal movement of the second cam follower in said first sense to the pinion shaft.

28. A boring machine according to claim 22, wherein the pinion shaft is displaceable relative to the housing from said first detented position or said second detented position to a third detented position, in which the pinion shaft is rotatable relative to the housing in either sense.

29. A boring machine according to claim 16, wherein the collapsible torque transmission linkage comprises a first link connected to the housing in a manner permitting pivotal movement of the first link relative to the housing about an axis perpendicular to the axis of rotation of the drive member, a second link connected to the attachment means in a manner permitting pivotal movement of the second link relative to the attachment means about an axis perpendicular to the central axis of the passage defined by the bearing assembly, and pivot means connecting the first and second links together in a manner permitting relative angular movement thereof.

30. A boring machine according to claim 29, wherein the first link comprises a first Y-shaped member having two legs attached to the housing at opposite sides respectively of the rotational axis of the drive member, and also having a stem, and the second link comprises a second Y-shaped member having two legs connected to the attachment means at opposite sides respectively of the central axis of the passage defined by the bearing assembly, and also having a stem, the stems of the first and second Y-shaped members being connected together for relative pivotal movement about an axis parallel to the axes of pivotal movement of the first and second Y-shaped members relative to the housing and the attachment means respectively.

31. A rotary drive mechanism for bringing about rotation of an elongate shaft about a longitudinal axis thereof, comprising a support structure, a cam member having a cam surface, means for moving the cam member relative to the support structure cyclically along a predetermined path, a cam follower positioned to engage the cam surface during at least a portion of each cycle of movement of the cam member and pivotable relative to the support structure about the axis of rotation of the elongate shaft, clutch means effective to transmit pivotal movement of the cam follower in a first sense to the shaft and to not transmit pivotal movement of the cam follower in a second sense, opposite said first sense, to the shaft, a bushing through which the shaft extends, and means for preventing relative rotational movment of the bushing and the shaft when the shaft is in a first longitudinal position and permitting relative rotational movement of the bushing and the shaft when the shaft is in a second longitudinal position.

32. A rotary drive mechanism according to claim 31, comprising a backlash prevention clutch effective between the bushing and the support structure to permit rotation of the bushing relative to the support structure in said first sense and to prevent rotation of the bushing relative to the support structure in said second sense.

33. A rotary drive mechanism for bringing about rotation of an elongate shaft about a longitudinal axis thereof, comprising a support structure, a cam member mounted to rotate about a predetermined axis of rotation and having a cam surface that is annular and is coaxial with the cam member, means for rotating the cam member about said predetermined axis, a cam follower positioned to engage the cam surface during at least a portion of each cycle of rotation of the cam member and pivotal relative to the support structure about the axis of rotation of the elongate shaft, and clutch means effective to transmit pivotal movement of the cam follower in a first sense to the shaft and to not transmit pivotal movement of the cam follower in a second sense, opposite said first sense, to the shaft.

34. A rotary drive mechanism according to claim 33, wherein the axis of rotation of the shaft is perpendicular to the axis of rotation of the cam member.

35. A rotary drive mechanism according to claim 33, wherein the cam member has a second annular cam surface and the feed drive means comprise a second cam follower positioned to engage the second cam surface during at least a portion of each revolution of the cam member and pivotable about the axis of rotation of the shaft, and second clutch means effective to transmit pivotal movement of the second cam follower in the second sense to the shaft when the shaft is in its second position and to not transmit pivotal movement of the second cam follower in the first sense to the shaft.

* * * * *